US006646971B1

United States Patent
Griffin

(12) United States Patent
(10) Patent No.: US 6,646,971 B1
(45) Date of Patent: Nov. 11, 2003

(54) CLEANING DISC FOR COMPACT DISC PLAYER

(76) Inventor: Jerry D. Griffin, 19021 E. Oxford Dr., Aurora, CO (US) 80013

( * ) Notice: Subject to any disclaimer, the term of this patent is extended or adjusted under 35 U.S.C. 154(b) by 0 days.

(21) Appl. No.: 09/515,535

(22) Filed: Feb. 29, 2000

(51) Int. Cl.$^7$ ............................................. G11B 17/04
(52) U.S. Cl. ..................................................... 369/71
(58) Field of Search ........................... 369/72, 74, 71, 369/77.1, 75.1; 15/97.1, 102; 360/128

(56) References Cited

U.S. PATENT DOCUMENTS

| | | | | |
|---|---|---|---|---|
| 4,180,840 A | * | 12/1979 | Allan ......................... | 360/128 |
| 4,375,658 A | * | 3/1983 | Martinelli ................... | 360/128 |
| 4,499,516 A | * | 2/1985 | Purdy et al. ................ | 360/128 |
| 4,709,437 A | * | 12/1987 | Hehn et al. .................. | 369/72 |
| 5,136,570 A | * | 8/1992 | Takai et al. ................ | 369/77.1 |
| 5,150,349 A | * | 9/1992 | Takai et al. ................ | 369/75.2 |
| 5,235,485 A | * | 8/1993 | Martin ....................... | 360/128 |
| 5,311,634 A | * | 5/1994 | Andros ........................ | 15/97.1 |
| 5,321,687 A | * | 6/1994 | Kinoshita et al. .......... | 369/75.2 |
| 5,793,728 A | * | 8/1998 | Selby et al. ................ | 369/75.1 |
| 5,870,792 A | | 2/1999 | Shurtliff ..................... | 15/102 |
| 5,896,157 A | | 4/1999 | Fisher, Sr. .................. | 347/171 |
| 5,963,526 A | | 10/1999 | Lee ............................. | 369/72 |
| 5,966,360 A | | 10/1999 | Miyazaki et al. ............ | 369/71 |
| 6,028,830 A | * | 2/2000 | Fritsch et al. ................ | 369/71 |
| 6,556,529 B1 | * | 4/2003 | Onishi et al. ............... | 369/77.1 |

FOREIGN PATENT DOCUMENTS

| | | | | |
|---|---|---|---|---|
| JP | 63-298762 | * | 12/1988 | ........... G11B17/04 |
| JP | 63-298763 | * | 12/1988 | ........... G11B17/04 |
| JP | 632988762 | * | 12/1988 | .................. 369/72 |
| JP | 632988763 | * | 12/1988 | .................. 369/72 |

* cited by examiner

Primary Examiner—William Korzuch
Assistant Examiner—C R Beacham
(74) Attorney, Agent, or Firm—Sheridan Ross P.C.

(57) ABSTRACT

A cleaning disc is provided to clean contaminated interior surfaces of a CD player. The cleaning disc is dimensioned to simulate a CD; however, in the first embodiment, the cleaning disc has stop tabs which prevent it from being fully loaded within a CD player. The front edge of the cleaning disc has a progressively narrowing contour, preferably semi-circular in shape, which simulates a CD. The CD player attempts to fully load the cleaning disc but fails as the stop tabs prevent further insertion. The load roller continues to spin thereby increasing the cleaning action of the load roller with the cleaning disc. The cleaning disc can be single or multiple layers, and can be composed of materials which most advantageously clean the load roller, and the other contact surfaces within the CD player including the upper and lower skid plates which also may become contaminated. In a second embodiment, the cleaning disc has the same shape and size as a CD. The second embodiment is used for cleaning the interior surfaces of a CD player which include a magazine style loader.

11 Claims, 2 Drawing Sheets

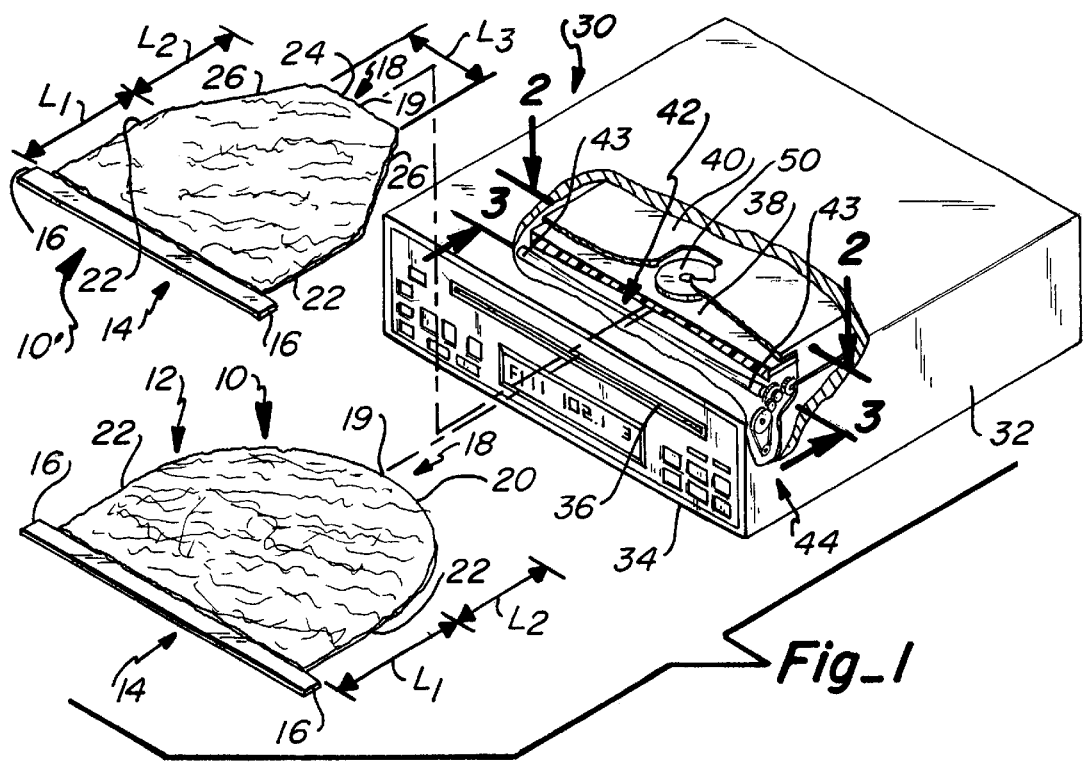

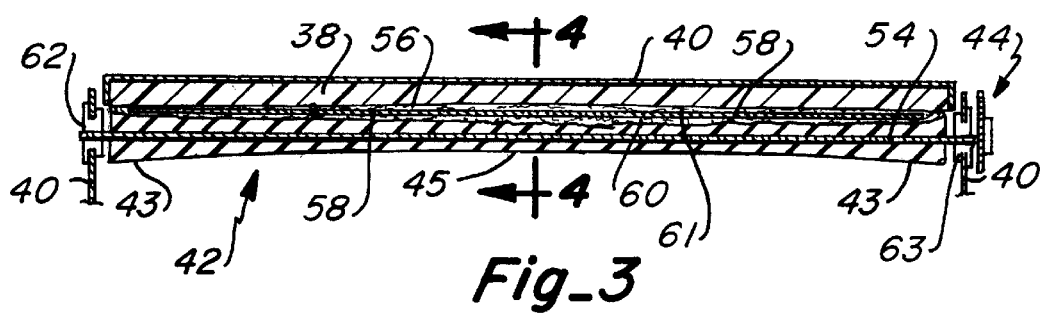
Fig_3
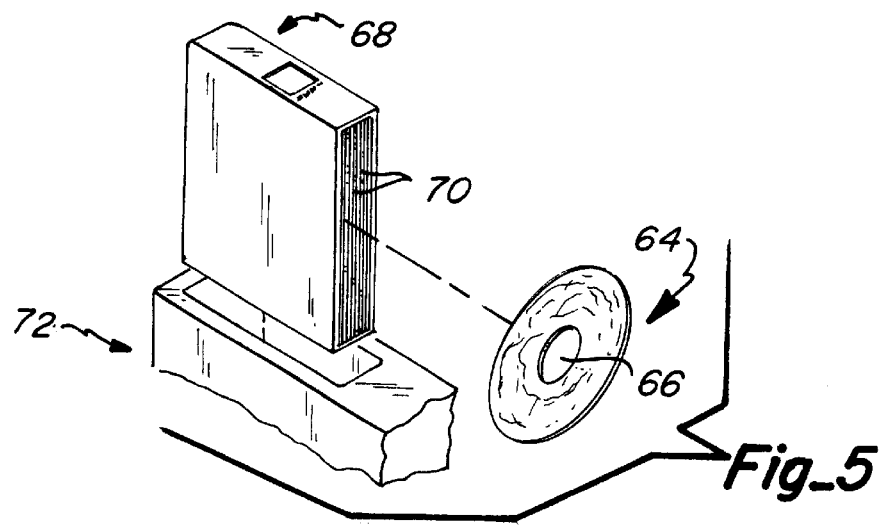
Fig_5
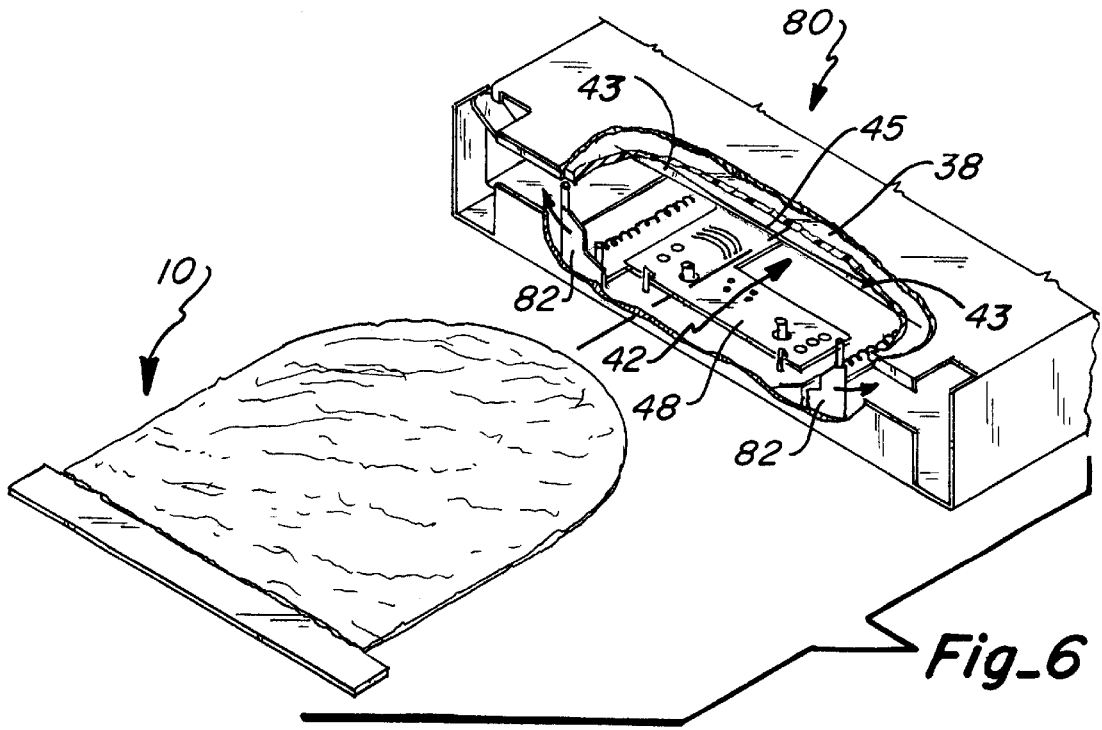
Fig_6

CLEANING DISC FOR COMPACT DISC PLAYER

TECHNICAL FIELD

This invention relates to cleaning device, and more particularly, to a cleaning disc used for cleaning interior components of a compact disc player.

BACKGROUND ART

Compact disc (CD) players are commonly found in not only stereo systems used in the home, but also within automobiles. Although compact discs (CDs) are more resilient to becoming damaged than cassette tapes, the surface of a compact disc can become damaged due to contamination within the compact disc player. In order to clean the interior of a CD player, it must be removed from its installed location and disassembled. This removal and disassembly is extremely time consuming. Furthermore, due to the mechanical complexity of many CD players, disassembly by a layman can be a disastrous endeavor in which parts are damaged or lost. Typically, a trained technician is the person who provides such cleaning maintenance for the CD player; however, this type of maintenance is expensive because of the labor involved.

There are devices known which are intended to clean a compact disc. One example of this includes U.S. Pat. No. 5,963,526 which discloses a radially reciprocating cleaning device.

Another example of a device used for cleaning a compact disc is shown in U.S. Pat. No. 5,966,360, which is capable of concurrently cleaning both a magnetic head of a magneto optical disc apparatus and an optical lens thereof.

Yet another example of a compact disc cleaning device is shown in U.S. Pat. No. 6,000,085. This invention is characterized by an enclosure having a cover and a seat, and a turntable that is rotated on the cover. A cleaning element movably attaches at the near end of the turntable. When the user rotates a knob of the cleaning device, the turntable revolves enabling the cleaning element to rotate within the radius of a compact disc thereby cleaning the disc.

Another example of a device that is used for cleaning a compact disc includes U.S. Pat. No. 5,870,792, characterized by a sponge-like material surrounded on two sides by substantially rigid plates that serve as support for the sponge-like material. The plates include a number of apertures formed therein. The sponge-like material protrudes through apertures on the plates, allowing the sponge-like material to contact the surface of the compact disc during the cleaning process.

While the foregoing references may be adequate for their intended purpose, each fail to address the primary source of contamination which causes the compact disc to become dirty in the first place. Therefore, while cleaning the compact discs has some merit in preventing damage, a clean compact disc which plays within a contaminated CD player immediately defeats the purpose of cleaning the CD.

A typical front loading automotive CD player has a rubber roller which is positioned just inside the CD opening of the CD player. This rubber roller is driven by a small motor which causes the roller to rotate for purposes of loading and unloading the CD. The roller becomes contaminated by dust, finger oils and general dirt which works its way into the device. Particularly in automotive CDs where CDs are more prone to be exposed to dirt, the CDs themselves often transfer dirt to the rubber roller. Once contaminated, the roller can no longer provide optimum traction on the CD, and may spin freely with a loaded CD moving very slowly or not moving at all in response to contact with the roller. This condition may cause the CD to become jammed, or the CD player may inadvertently eject the CD. Additionally, the continuing roller movement with a stationary or semi-stationary CD causes great damage to the CD itself as the contaminants become embedded within the CD surfaces. Additionally, there are other surfaces which come into contact with the CD as it is loaded within a CD player, such as the upper and lower skid plates which help to guide the CD within the loading chamber of the CD player. These skid plates also become dirty and can cause damage to the CD.

Accordingly, there is a need for a device which allows cleaning of the interior elements of the CD player, without having to dissemble or otherwise remove the CD player from operation. Additionally, there is a need for a device which can be used to clean such interior elements without causing the CD player to jam or otherwise misfunction.

SUMMARY OF THE INVENTION

In accordance with this invention, a cleaning disc is provided which cleans the surfaces which normally come into contact with a CD as it is loaded within a CD player. In its simplest form, the cleaning device is a substantially planar disc-like member having a progressively narrowing contour at the front edge thereof in the shape of a semi-circle or taper. The cleaning device simulates a compact disc and the CD player sensors which allow a CD to be loaded within the CD player initially sense the cleaning disc as a CD. However, the back or rear edge of the cleaning disc has stop tabs which prevent the cleaning disc from being loaded completely within the CD player. The device can be made of any thin, rigid material such as cardboard, plastic, or the like. On one or both sides of the device, it may be covered with an absorbent, textured material such as light cotton canvas. The overall thickness of the cleaning device is similar to that of a CD. The textured side of the device may be lightly dampened with a mild liquid cleaner that has a relatively high evaporation rate such as a common household glass cleaner.

In operation, the round or tapered end of the device is inserted within the CD opening of the CD player with the dampened side facing downward to be placed into contact with the load roller. At this time, the load sensors of the CD player activate the load motor and the load roller begins to rotate pulling the cleaning device within the CD player. As the cleaning device is pulled inward, a small amount of liquid cleaner is transferred onto the load roller which begins to dissolve the contaminates thereon. The cleaning device continues to be pulled inward until the stop tabs make contact with the front exterior edge of the CD player. The cleaning device can no longer be loaded any further within the device; however, the load roller will continue to rotate for a short period of time. During this time, the friction between the roller and the cleaning device effectively cleans the load roller and transfers the contaminates to the surface of the cleaning device. After the short period of time in which the roller continues to rotate, the CD player recognizes that the CD cleaning device is not a CD as the most interior load sensors do not sense movement of the cleaning device therein. Accordingly, the load roller reverses its direction ejecting the cleaning device automatically. The process can be repeated as often as necessary to maintain trouble free load operations. In addition to cleaning the loading roller, the cleaning disc contacts the upper and lower skid plates and also removes contaminates thereon.

Further advantages of the invention will become apparent from the description which follows, taken in conjunction with the accompanying drawings.

BRIEF DESCRIPTION OF THE DRAWINGS

FIG. 1 is a perspective view of two alternate embodiments of the cleaning disc of this invention, along with a fragmentary perspective view of a generic CD player to be cleaned by the cleaning disc.

FIG. 2 is a plan view of the CD player of FIG. 1, which has been illustrated below the horizontal section line 2—2 of FIG. 1, and illustrating the cleaning disc prior to and after being loaded within the CD player;

FIG. 3 is a vertical section, taken along line 3—3 of FIG. 1, illustrating the cleaning disc loaded in the CD player between the loading roller and the upper skid plate;

FIG. 4 is a vertical section, taken along line 4—4 of FIG. 3, showing a cleaning disc loaded in the CD player, and being in engagement with the load roller and in contact or close contact with the upper skid plate;

FIG. 5 is a perspective view of another form of the cleaning disc of this invention as used with a magazine style loader of a CD player; and FIG. 6 is another perspective view of the cleaning disc prior to being loaded into an alternate type of CD player utilizing limit switches for load sensors.

DETAILED DESCRIPTION OF THE DRAWINGS

FIG. 1 illustrates the cleaning disc 10 of this invention, and an alternative embodiment cleaning disc 10'. The cleaning disc 10 is a semi-rigid, substantially planar shaped device, allowing it to be loaded within CD player 30. The cleaning disc 10 includes a body portion 12 having a proximal end 14 with a pair of stop tabs 16 protruding laterally away from opposite sides thereof. The distal end 18 includes a most distal point 19 which is the first point which enters the CD player when loaded. The distal end 18 has a semi-circular shape in the form of a semi-circular portion 20 which extends on both sides of the most distal point 19. The semi-circular portion 20 transitions into parallel side edges 22 which extend rearwardly to stop tabs 16. The alternate cleaning disc 10' includes the same elements as cleaning disc 10; however, the distal end 18 includes a flat front edge 24, and a pair of angled edges 26 which slope away from front edge 24.

FIG. 1 also illustrates a generic CD player 30, such as a front loading automotive CD player which is found in automobiles. As shown, the CD player 30 has an external housing 32 which houses the mechanical and electronic elements of the CD player. The forward or front edge of the housing 32 has a front display 34 including a number of controls and other dials to control the CD player. Directly above the front display 34 is a CD opening 36 in the form of a slit or horizontally extending opening which receives a CD. The CD opening 36 communicates with the elements within the CD player which load the CD. These elements may be referred to collectively as the loading mechanism. The cleaning disc 10 is sized to simulate a CD. That is, the semi-circular portion 20 has the same shape and size as a CD. As shown in FIGS. 1 and 4, an upper skid plate 38 limits the upward travel of a CD loaded in the CD player opening 36. A bracket 40 is used to maintain the skid plate 38 in position. Disposed directly below the upper skid plate 38 and in parallel relationship thereto is load roller 42. As best seen in FIG. 2, load roller extends parallel with CD opening 36 and has a slightly larger diameter at both ends 43 in comparison to center portion 45. A combination of gears/pulleys 44 transfer rotational motion to the load roller 42 from load motor 46. Thus, the drive motor 46 and gears/pulleys 44 provide means for driving the load roller 42. Lower skid plate 48 is positioned adjacent the load roller 42 and guides the lower surface of a CD being loaded such that it contacts load roller 42. A clamping mechanism 50 is positioned within the CD player and engages the central opening in a CD once the CD is fully loaded. The clamping mechanism 50 clamps the CD in place allowing it to be read from the optics (not shown) in the CD player. Means for detecting a CD are provided in the CD player in the form of load sensors 52 which communicate with the circuitry (not shown) of the CD player. The load sensors 52 signal when a CD is being loaded. In the case of FIG. 2, a pair of photodiode-type sensors are used as the load sensors.

As best seen in FIGS. 3 and 4, the load roller 42 is journaled on a shaft 54 which is driven by the combination of gear/pulleys 44. As seen in the view of FIG. 3, the left end of the shaft 54 is simply supported by a bearing or holder 62, while the right end of the shaft 54 is also supported by a bearing/holder 63 but which also communicates with the combination of gear/pulleys 44 for driving the load roller.

As seen in FIG. 3, there is a very small gap between the lower surface 61 of upper skid plate 38 and the load roller 42. As also shown, the gap becomes slightly wider toward the center portion 45.

As shown in FIG. 4, the cleaning disc 10 may include a substrate or base layer 58, and one or more outer layers, such as first outer layer 56 which is bonded to one surface of the substrate 58, and second outer layer 60 which is bonded to the opposite surface of substrate 58. In addition to a cotton-like material, first and second layers 56 and 60 may be made of a soft or spongy compressible material such as foam rubber or the like which is conducive to cleaning surfaces it comes into contact with. Since the load roller 42 has a slightly smaller diameter at center portion 45, it may be advantageous to provide a cleaning disc with the spongy material which allows the irregular shape roller to be cleaned across its entire length. The spongy material can be more compressed in the gap between the lower surface 61 and the end portions 43 of the load roller, yet the spongy material can expand within the larger gap between lower surface 61 and center portion 45. Accordingly, more consistent cleaning can occur along the length of the load roller despite its irregular shape, because the spongy material better conforms in shape to the irregular shaped gap between lower surface 61 and load roller 42.

In order to achieve cleaning along the entire length of load roller 42, the length $L_1$, of side edges 22 needs to be long enough so that side edges 22 come into contact with the load roller 42. Similarly, the length $L_2$ needs to be short enough so that the final load sensor (not shown) within the CD player does not detect the cleaning disc and believe that a CD has been fully loaded. Similarly, the lengths $L_1$ and $L_2$ on the cleaning disc 10' need to match so that the CD player will not attempt to fully load the cleaning disc, yet the CD player will commence in its loading sequence causing the load rollers to initially rotate.

In its simplest form, it should be also understood that the cleaning disc of the invention can be of a single layer, and there is no absolute requirement that a first or second outer layer be used. In comparing surface roughnesses of the first outer layer 56 versus the second outer layer 60, it may be preferable for the layer which comes into contact with the upper skid plate 38 to have a slightly smoother surface so that the load roller can pull the cleaning disc inward, yet the smoother surface will easily slide along the skid plate without undue friction or binding.

As shown in FIG. 5, the cleaning disc of this invention may be found in yet another alternative embodiment, shown as cleaning disc 64. In this embodiment, the cleaning disc has the same shape and size as a compact disc, including a central opening 66. This type of cleaning disc must be used with a compact disc player 72 which utilizes a magazine style loader 68. Loader 68 loads a compact disc as chosen by the operator who has the option of playing one or more CDs which reside in separate loading chambers 70. CD player 72 has a similar arrangement as shown in FIG. 1 in terms of the use of a load roller and one or more skid plate surfaces which help to guide the CD within the CD player; however, CD player 72 does not have an exposed CD opening for which to directly load a CD. The cleaning disc 64 must be the same shape as a CD otherwise, the magazine loader would jam as it can only load objects which have the same shape as a CD. Thus, in the case of cleaning disc 64 in FIG. 5, the cleaning disc 64 becomes fully loaded within CD player 72; however, once the CD player realizes that there is no digital media from which to read signals, then the cleaning disc is ejected.

FIG. 6 illustrates another example of a CD player 80 similar to CD player 30, the only difference being the use of limit switches 82 which detect the loading of a CD as opposed to photodiode sensors 52. In the case of CD player 80, a CD which is loaded within the CD player engages the pair of opposing limit switches 82 which signals the CD player to accept the CD for loading. Since the semi-circular portion 20 simulates a CD, the limit switches will cause the CD player to react as if a CD has been loaded. However, stop tabs 16 prevent full loading of the cleaning disc which causes the CD player to eject the cleaning disc a short period of time after the stop tabs engage the exterior surface of the CD player. Although the cleaning disc 10' does not have the characteristic semi-circular portion 20, the angled side edges 26 enable limit switches 82 to be tripped so that the CD player believes that a CD is being loaded therein.

As applied to cleaning disc 10', the length $L_3$ of front edge 24 must be narrow enough to fit between limit switches 82. Although FIG. 2 illustrates photodiode sensors 52 and FIG. 6 illustrates a pair of limit switches 82 which are mounted adjacent the lower skid plate, it shall be understood that the cleaning discs 10 and 10' can be modified in their frontal dimensions so that they are compatible with any CD player which includes some combination of photodiode sensors or limit switches.

The use of cleaning disc 10 and 10' is the same for the CD players illustrated in FIGS. 1 and 6. The round or tapered end of the cleaning device is inserted within a CD opening 36 of the CD player 30/80. Optionally, the cleaning device may be lightly dampened with a mild liquid cleaner, and the cleaning devices inserted such that the dampened side faces downward in contact with the load roller 42. The load sensors of the CD player activate the load motor 46, and the load roller 42 begins to rotate the cleaning device within the CD player 30/80. As the cleaning device is pulled inward, a small amount of liquid cleaner is transferred onto the load roller 42 which begins to dissolve the contaminate. The cleaning device continues to be pulled inward until the stop tabs 16 make contact with the front exterior edge of the CD player 34. At this point, the cleaning device can no longer be loaded any further within the device; however, the load roller 42 will continue to rotate for a short period of time. During this time, friction between the load roller 42 and the cleaning device effectively cleans the load roller 42 and transfers the contaminates to the surface of the cleaning device. After the short period of time in which the load roller continues to rotate, the CD player 30/80 recognizes that the cleaning device is not an actual CD as the most interior load sensors (not shown) do not sense movement of the cleaning device therein. Accordingly, the load roller reverses its direction ejecting the cleaning device automatically. The cleaning disc may be reinserted within the CD player as often as necessary to effectively clean the interior of the CD player. As for the cleaning disc 64 shown in FIG. 5 which is used in conjunction with a magazine style loader 68 and CD player 72, since the cleaning disc 64 must be of the same shape as a CD, the cleaning disc 64 has no stop tabs which would allow the load roller within CD player 72 to continue to spin for optimal cleaning. Rather, the load roller within CD player 72 will load the cleaning disc in the same manner as a CD, and any cleaning action which takes place must occur during the movement of the cleaning disc 64 through the CD player as it is fully loaded therein. Because the magazine style loader 68 does not allow direct access to the load roller, there is no feasible way to access the load roller without dissembling the magazine style loader from the CD player. Nonetheless, cleaning disc 64 still achieves effective cleaning of the interior surfaces of the CD player which may become contaminated. Therefore, the full loading of cleaning disc 64 through a complete load cycle within the CD player 72 still achieves cleaning of the interior surfaces within the CD player. As with the repeated use of cleaning discs 10 and 10', cleaning disc 64 may be reinserted through magazine style loader 68 to repeatedly clean the CD player as desired.

The advantages of the foregoing invention are clear. Without having to dissemble a CD player, the load roller of the CD player may be cleaned, along with other surfaces of the CD player which may come into contact with a CD. These surfaces are the ones most often contaminated, and which can cause damage both to the CD, and to the CD player. The cleaning disc may simply be a single layer which is similar in thickness to a CD, or may be multiple layers to allow some flexibility in the type of desired cleaning action. The cleaning disc not only cleans the upper and lower skid plates as the cleaning disc moves in and out of the gap between the skid plates, but also achieves very efficient cleaning of the load roller.

This invention has been described in detail with reference to a particular embodiment thereof, but it will be understood that various other modifications can be effected within the spirit and scope of this invention.

What is claimed is:

1. In combination, a loading mechanism of a CD player for loading a CD therein, and a cleaning disc comprising:
   a loading mechanism comprising:
      a front display having a CD opening for receiving a CD, said CD opening extending a depth within said loading mechanism;
      an upper skid plate, defining an upper surface positioned in communication with said CD opening;
      a lower skid plate spaced from said upper skid plate and positioned in communication with said CD opening;
      means for detecting a CD as it is inserted in said CD opening and into the loading mechanism;
      a load roller mounted in said CD player adjacent said upper and lower skid plates, and extending substantially parallel to a CD inserted in said CD opening;
   means for driving said load roller mounted adjacent said load roller causing said load roller to engage a CD as it is inserted in the CD opening and to displace the CD to a position for playing in the CD player; and a cleaning disc comprising:

a substantially planar member, said substrate having proximal and distal ends, that extend substantially along the entire surfaces, said distal end having a progressively narrowing contour sized to fit within said CD opening and to activate said means for detecting causing said CD player to initiate a loading sequence to cause said load roller to pull said cleaning disc within said CD opening to clean said load roller, said upper skid plate and said lower skid plate, and wherein the planar member maintains the substantially parallel upper and lower surfaces prior to and after insertion in the CD player.

2. The combination, as claimed in claim 1, wherein:

said load roller has an irregular diameter forming an irregular opening between said load roller and one of said upper and lower skid plates; and said planar member includes a spongy compressible material which fills said irregular openings and engages at least one of said upper and lower skid plates to clean it.

3. The combination, as claimed in claim 1, further including:

at least one stop tab integral with said proximal end.

4. The combination, as claimed in claim 1, further including:

a cleaning solution applied to said cleaning disc.

5. The combination, as claimed in claim 1, wherein:

said progressively narrowing contour is semi-circular in shape.

6. The combination, as claimed in claim 1, wherein:

said progressively narrowing contour includes two opposing angled edges.

7. The combination, as claimed in claim 1, wherein:

said means for detecting includes at least one photodiode.

8. The combination, as claimed in claim 1, wherein:

said means for detecting includes at least one limit switch positioned in communication with said CD opening to contact said progressively narrowing contour as said cleaning disc is inserted within said CD opening.

9. In combination, a loading mechanism of a CD player and a cleaning disc for cleaning interior surfaces of the CD player, said combination comprising:

a loading mechanism comprising a front display having a CD opening for receiving a CD, a load roller mounted in said CD player extending substantially parallel to a CD inserted in said opening, said load roller having a non-uniform diameter, and means for driving said load roller mounted adjacent said load roller;

a cleaning disc comprising a substantially planar member having proximal and distal ends, an upper surface and a lower surface substantially parallel to said upper surface, wherein said planar member has a cross-section of a substantially uniform height, said distal end having a progressively narrowing contour sized to clean contact surfaces within the CD player when inserted into the CD opening of the CD player, the planar member being compressible in response to contact with the contact surfaces, and the planar member maintaining the parallel upper and lower surfaces prior to and after insertion in the CD player; and said loading mechanism further includes an upper skid plate and a lower skid plate spaced from the upper skid plate, said skid plates being positioned in communication with said CD opening.

10. In combination, a loading mechanism of a CD player and a substrate for cleaning interior surfaces of the CD player, the combination comprising:

a loading mechanism comprising a front display having a CD opening for receiving a CD, a load roller mounted in said CD player extending substantially parallel to a CD inserted in said opening, said load roller having a non-uniform diameter, and means for driving said load roller mounted adjacent said load roller;

a substantially planar substrate having a circular shape, a geometric center, a central opening formed in said substrate and centered on said geometric center, and said planar substrate having an upper surface and a lower surface substantially parallel to said upper surface, wherein said planar substrate has a cross-section of a substantially uniform height;

a cleaning layer bonded to said substrate, and wherein the planar substrate maintains the parallel upper and lower surfaces and uniform height cross-section before and after insertion in the CD player; and said loading mechanism further includes an upper skid plate and a lower skid plate spaced from the upper skid plate, said skid plates being positioned in communication with said CD opening.

11. A method of cleaning a load roller of a CD player comprising the steps of:

aligning a planar cleaning disc with a CD opening of a CD player, said cleaning disc having substantially parallel upper and lower surfaces that provide the cleaning disc with a cross-section of a substantially uniform height;

inserting the cleaning disc in the CD opening;

engaging the cleaning disc with a rotating load roller of the CD player, the load roller having a non-uniform diameter;

moving the cleaning disc partially into the CD player by the rotation of the load roller in engagement with the cleaning disc;

compressing the cleaning disc in response to contact with the load rollers;

preventing further insertion of the cleaning disc into the CD opening;

continuing to rotate the load roller while in engagement with the cleaning disc to clean the load roller;

ejecting the cleaning disc by the load roller which reverses its direction of rotation;

maintaining the planar cleaning disc in a planar shape including the substantially parallel upper and lower surfaces prior to and after engagement with the CD player; wherein said CD player further includes an upper skid plate and a lower skid plate spaced from the upper skid plate, said upper and lower skid plates being placed in communication with the opening of the CD player.

* * * * *